(12) United States Patent
Truelove et al.

(10) Patent No.: US 11,909,814 B1
(45) Date of Patent: Feb. 20, 2024

(54) CONFIGURABLE COMPUTING RESOURCE ALLOCATION POLICIES

(71) Applicant: Amazon Technologies, Inc., Seattle, WA (US)

(72) Inventors: Jeremy Truelove, Seattle, WA (US); Diwakar Gupta, Seattle, WA (US); Leslie Andrew Prock, Seattle, WA (US); Zachary Christopher Mouri, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/365,099

(22) Filed: Mar. 26, 2019

(51) Int. Cl.
*H04L 67/1012* (2022.01)
*G06F 9/50* (2006.01)
*H04L 67/1014* (2022.01)

(52) U.S. Cl.
CPC ........ *H04L 67/1012* (2013.01); *G06F 9/5011* (2013.01); *H04L 67/1014* (2013.01)

(58) Field of Classification Search
CPC . H04L 67/1012; H04L 67/1014; H04L 67/10; H04L 67/1001; H04L 67/1008; G06F 9/5011; G06F 9/5077; G06F 9/4881; G06F 9/505; G06F 9/5027
See application file for complete search history.

(56) References Cited

U.S. PATENT DOCUMENTS

| | | | | |
|---|---|---|---|---|
| 7,295,990 | B1 * | 11/2007 | Braumoeller | G06Q 10/063 705/7.31 |
| 8,190,583 | B1 * | 5/2012 | Shekar | H04L 67/1097 707/688 |
| 8,417,578 | B1 * | 4/2013 | Evans | G06Q 30/00 705/26.1 |
| 9,055,055 | B1 * | 6/2015 | Strand | G06F 21/45 |
| 9,313,230 | B1 * | 4/2016 | Kruse | G06F 11/004 |
| 10,146,587 | B2 * | 12/2018 | Venkataraman | G06F 16/2343 |
| 2003/0149747 | A1 * | 8/2003 | Rai | H04L 67/535 709/219 |
| 2004/0267897 | A1 * | 12/2004 | Hill | G06F 9/505 709/217 |
| 2005/0259683 | A1 * | 11/2005 | Bishop | H04L 41/0896 370/468 |
| 2006/0026036 | A1 * | 2/2006 | Mahmood | G06Q 10/04 703/2 |

(Continued)

*Primary Examiner* — Ninos Donabed
(74) *Attorney, Agent, or Firm* — Thomas | Horstemeyer, LLP

(57) ABSTRACT

Disclosed are various embodiments for resource allocation policies for a hosted computing environment that can be configured by organizations that use the hosted computing environment under a utility computing model. In one embodiment, a resource allocation request to allocate a computing resource within a hosted computing environment is received. The resource allocation request is associated with an account of an organization. It is determined that a fulfillment of the resource allocation request would violate a resource allocation policy configured by the organization within the hosted computing environment. The resource allocation request is prevented from being automatically fulfilled in response to determining that the fulfillment of the resource allocation request would violate the resource allocation policy.

20 Claims, 6 Drawing Sheets

(56) References Cited

U.S. PATENT DOCUMENTS

| | | | |
|---|---|---|---|
| 2006/0143617 A1* | 6/2006 | Knauerhase | G06F 9/50 718/104 |
| 2007/0101000 A1* | 5/2007 | Childress | G06F 9/5083 709/226 |
| 2007/0124378 A1* | 5/2007 | Elzur | H04L 47/10 709/204 |
| 2008/0120129 A1* | 5/2008 | Seubert | G06Q 40/125 705/305 |
| 2009/0029645 A1* | 1/2009 | Leroudier | H04W 84/047 455/7 |
| 2011/0077986 A1* | 3/2011 | DeGregorio | G06Q 10/06 705/7.37 |
| 2012/0084113 A1* | 4/2012 | Brandwine | G06F 9/4881 705/7.22 |
| 2012/0203762 A1* | 8/2012 | Kakarlamudi | G06F 16/24542 707/718 |
| 2013/0246208 A1* | 9/2013 | Jain | G06F 9/50 718/104 |
| 2015/0207752 A1* | 7/2015 | Birkestrand | H04L 67/1008 709/226 |
| 2016/0094483 A1* | 3/2016 | Johnston | G06F 8/65 709/226 |
| 2016/0128083 A1* | 5/2016 | Shakya | H04W 72/0446 455/406 |
| 2016/0162478 A1* | 6/2016 | Blassin | G06Q 10/063112 706/12 |
| 2016/0164762 A1* | 6/2016 | Reque | G06F 9/5077 718/1 |
| 2017/0153906 A1* | 6/2017 | Bektas | G06F 9/45558 |
| 2017/0270450 A1* | 9/2017 | Binotto | H04L 43/0876 |
| 2017/0339070 A1* | 11/2017 | Chang | H04L 47/829 |
| 2018/0115551 A1* | 4/2018 | Cole | H04L 41/18 |
| 2020/0128051 A1* | 4/2020 | Sondhi | H04L 51/234 |
| 2020/0252223 A1* | 8/2020 | Tomaselli | H04L 9/0643 |
| 2020/0252281 A1* | 8/2020 | Abhyankar | G06F 16/24556 |

* cited by examiner

100

Example Computing Provider　　　Logged in as *Example Organization Admin*

Configure Resource Allocation Policy for Example Organization

☑ Enable Resource Allocation Policy　← 103

Monthly Spend: (Recommendation: $800)　← 109

← 106

$10　　$1000　　　　　　　　　　Unlimited

Permitted Instance Types:

☑ Type 1　☑ Type 3　← 112
☑ Type 2　☐ Type 4

Permitted Regions:

☐ Region 1　☐ Region 3　← 115
☑ Region 2　☐ Region 4

Exempt Accounts:

| User6, User20 |　← 118

Action Upon Request that Violates Policy?

| Notify User, Allow Manual Override ▾ |　← 121

( Save Changes )　← 124

CONFIGURABLE COMPUTING RESOURCE ALLOCATION POLICIES

BACKGROUND

It is increasingly common for organizations to turn to hosted computing environments operated under a utility computing model to meet their computing resource needs. In the past, organizations may have operated their own servers, either on premise or collocated in a data center, but such a model lacks flexibility and may be more costly. Scaling up or down with computing hardware owned by the organization may involve excessive lead time and expense, which can result in the organization either having too much or too little computing capacity. By contrast, in hosted computing environments operated under a utility computing model, it can be quick and simple to launch additional machine instances or terminate underutilized machine instances. Machine instances may be allocated dynamically as desired in data centers around the world and with varying amounts of processor power, memory, network bandwidth, and/or other characteristics.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 1 is a drawing of an example user interface according to various embodiments of the present disclosure.

DETAILED DESCRIPTION

Figure 2:
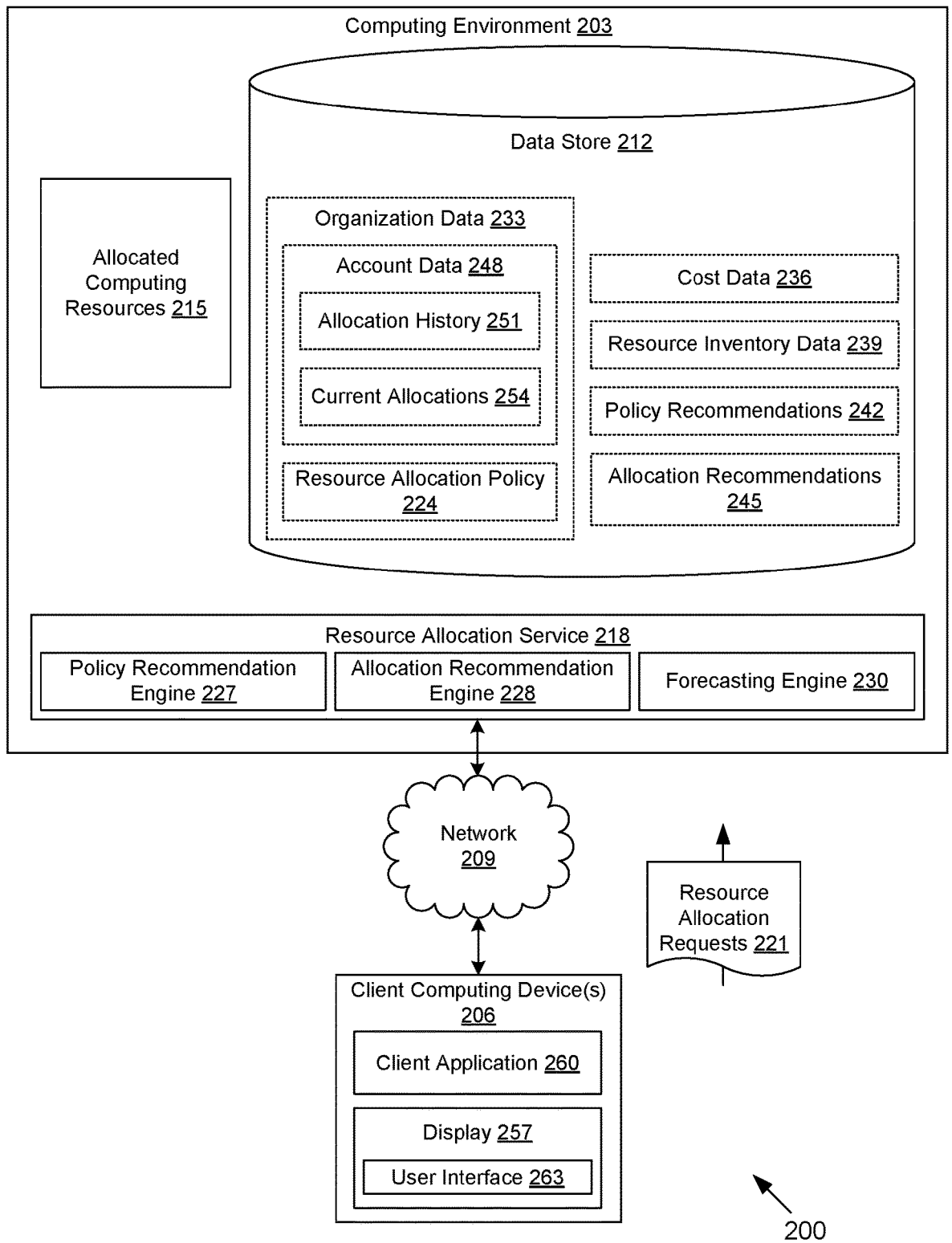
FIG. 2 is a schematic block diagram of a networked environment according to various embodiments of the present disclosure.

The present disclosure relates to configurable computing resource allocation policies. In hosted computing environments operated under a utility computing model, it can be relatively fast and easy for users to allocate additional computing capacity. For example, such allocations may be done manually by a user making a request through an electronic user interface such as a web browser or programmatically through an auto-scaling application making an application programming interface (API) call. Under the utility computing model, organizations are invoiced according to usage metrics that may be based on a variety of factors. Some machine instance types may be more costly than others to allocate, and cost may vary according to data center location, time-based demand, and other parameters. Utilization of specific resource dimensions such as processor time, memory, data storage, network bandwidth, and so on, may be metered and billed.

Some organizations may find themselves having unanticipated computing expenses at the end of a billing cycle. For instance, the organization's account with the hosted computing environment may be shared among different teams or users of the organization. These different teams or users may independently make computing resource allocation decisions that collectively result in an unexpectedly high overall cost for the organization. Also, programmatic managers such as auto-scalers may automatically increase capacity in a way that results in an unexpected expense. Services may be flooded with requests due to content that has gone viral or due to mistakes, and scaling to handle the unanticipated load may be costly. In some cases, the organization's account may have been compromised by a bad actor, who then makes unauthorized use of the organization's account to perform expensive computing functions (e.g., cryptocurrency mining), for which the organization may then be billed. An unauthorized use refers to the request and usage of resources through the organization's account for a purpose that is not for the benefit of the organization and/or that is not in line with the business goals of the organization.

The third-party operator of the hosted computing environment may provide some default limits on computing resource allocation, but such default limits are by design not overly restrictive. Different organizations may have widely different computing needs and budgets. Some organizations may anticipate and welcome peak traffic, while others may not at all. Thus, despite being under such default limits, many organizations may find themselves with unexpectedly high expenses. Also, the third-party operator may place differing limits on organizations based upon abnormal usage patterns, but it can take a relatively long time to recognize abnormal usage and implement restrictions.

The above-described challenges, among others, are addressed in some embodiments by the disclosed resource allocation policies that may be configured by organizations utilizing a hosted computing environment operated under a utility computing model. Organizations may specify restrictions such as overall cost budgets for a time period. These budgets may be applied across all accounts of the organizations, and/or separate budgets may be specified for individual accounts. Compliance with budget restrictions can involve analysis of the known or projected cost of a particular request over the time period, as well as the current resource consumption levels and/or projected resource consumption levels over the time period. Further, organizations may specify restrictions indicating that particular instance types, data center regions, or other capabilities are allowed or not allowed. Resource requests by users on behalf of the organization can be rejected based on non-compliance with these restrictions or allowed based on compliance with these restrictions. Suggested policies may be recommended to organizations, and specific computing resource allocations may be recommended to users based on their organization's policy and/or current or projected consumption level.

As one skilled in the art will appreciate in light of this disclosure, certain embodiments may be capable of achieving certain advantages, including some or all of the following: (1) more efficient allocations of computing resources to organizations according to the organizations' budgets, (2) more efficient allocations of computing resources for a hosted computing environment by encouraging allocations of underutilized types of computing resources or to shift consumption to underutilized times, (3) improving the functioning of the computing network by increasing responsiveness to security compromises, (4) improving responsiveness to allocation requests and reducing processor utilization by employing a two-tiered approach to evaluating allocation requests for application of customized policies, and so forth. In the following discussion, a general description of the system and its components is provided, followed by a discussion of the operation of the same.

Turning now to FIG. 1, shown is an example user interface 100 generated in accordance with various embodiments of the present disclosure. The user interface 100 allows a user affiliated with an organization ("Example Organization") to configure a resource allocation policy that applies to accounts of the organization with a hosted computing environment operated under a utility computing model ("Example Computing Provider"). The user interface 100 depicted in FIG. 1 is merely an non-limiting example, as there are many variations of user interfaces that may be employed to create or configure a resource allocation policy.

User interface 100 includes a component 103 that enables or disables a resource allocation policy for the organization. In this regard, a user may easily override any previously configured or suggested parameters of a resource allocation policy as desired.

User interface 100 includes a component 106 that enables specification of a cost limit to be applied across one or more or all accounts belonging to the organization over a time period. In this example, the time period is a month, but different time periods (e.g., days, weeks, years, user-defined time periods, etc.) may alternatively be specified. A recommendation 109 may be provided for a cost limit based on past and/or projected usage for the organization. In this non-limiting example, the recommendation 109 is for a cost limit of $800. The component 106 in this non-limiting example enables the user to specify a cost limit from $10 to unlimited, with $1000 being currently selected. Other parameters may be used in other examples.

In some scenarios, the cost limit may take into consideration credits that are pending or are predicted to be earned for the accounts. For example, the organization may have $200 in carryover credits for the last month, and might be predicted to earn $200 in credits for use during the current month, thereby reducing total spend in the current month by $400. Thus, in enforcing a cost limit, the total cost may be allowed to exceed an organization-defined cost limit by the predicted credit amount.

User interface 100 includes components 112 to specify which types of computing resources may be allocated for the organization. For example, the types may correspond to virtual or physical machine instance types, which may have varying characteristics in processor speed, memory, data storage, network bandwidth, graphics processor units (GPUs), etc. An organization may elect to allow one, some, or all of the different computing resource types, which may be associated with differing allocation costs. For example, a first resource type may cost $10 per month, while a second resource type may cost $25 per month. As shown, "Type 1," "Type 2," and "Type 3" are selected as permitted, while "Type 4" is not.

User interface 100 includes components 115 to specify which regions or locations are permissible for allocating computing resources for the organization. The regions may correspond to data centers or network topology locations where computing resources may be allocated. These may be in different countries or geographies, and the different regions may be associated with different costs. An organization may operate only in one region or fewer than all regions and may wish to specify permitted regions. For example, authorized users of an organization's account may be located in a particular region, and thus requests for resources in that region may be more likely to be legitimate. In contrast, certain types of unauthorized requests for resources (e.g., by a bad actor) may occur outside of this particular region, or may be known to occur in a specific other region. As shown, "Region 2" is selected as permitted, while "Region 1," "Region 3," and "Region 4" are not.

User interface 100 includes a component 118 that allows accounts of the organization to be specified that are exempt from the resource allocation policy. For example, the organization may wish to exempt critical accounts from limits or other policies to avoid downtime. In some scenarios, different resource allocation policies may be specified for different accounts of an organization. If different resource allocation policies are specified, an organization may specify a default resource allocation policy for accounts not having an individualized resource allocation policy.

User interface 100 includes a component 121 that allows an organization to specify what happens when a resource allocation request violates a resource allocation policy. In this example, the selected action is to notify a user and allow for a manual override. In other examples, the selected action(s) may be to refrain from automatically fulfilling the resource allocation request, block fulfillment of the resource allocation request, recommend alternative resource allocation requests, recommend a change to the resource allocation policy, notify an administrative user, and/or other actions.

A component 124 signals that any changes to the resource allocation policy should be saved and implemented. Although various user interface components are depicted in FIG. 1, it is understood that each of the referenced components may alternatively be implemented using different types of components, including buttons, checkboxes, radio buttons, sliders, drop-down boxes, and so forth. Also, in some cases, the user interface 100 may correspond to a command-based user interface controlled via text message, voice commands, physical gestures, and so on. Resource allocation policies may also be implemented programmatically via APIs (e.g., by web service calls).

With reference to FIG. 2, shown is a networked environment 200 according to various embodiments. The networked environment 200 includes a computing environment 203 and one or more client computing devices 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time. The computing environment 203 may correspond to a hosted computing environment that is operated under a utility computing model by a third party for use by a plurality of different organizations.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include allocated computing resources 215, a resource allocation service 218, and other applications, services, processes, systems, engines, or functionality not discussed in detail herein. The allocated computing resources 215 correspond to various types of computing resources that are allocated to organizations within the computing environment 203. To this end, the allocated computing resources 215 may include physical or virtual machine instances having varied types of characteristics, data storage resources, computing tasks, and/or other types of computing resources. The allocated computing resources 215 may be located in data centers in various locations, regions, or geographies. The allocated computing resources 215 may also be in different availability zones, where each availability zone has independent power supplies and/or network connections such that a power or network failure in one availability zone should not impact other availability zones.

Figure 3:
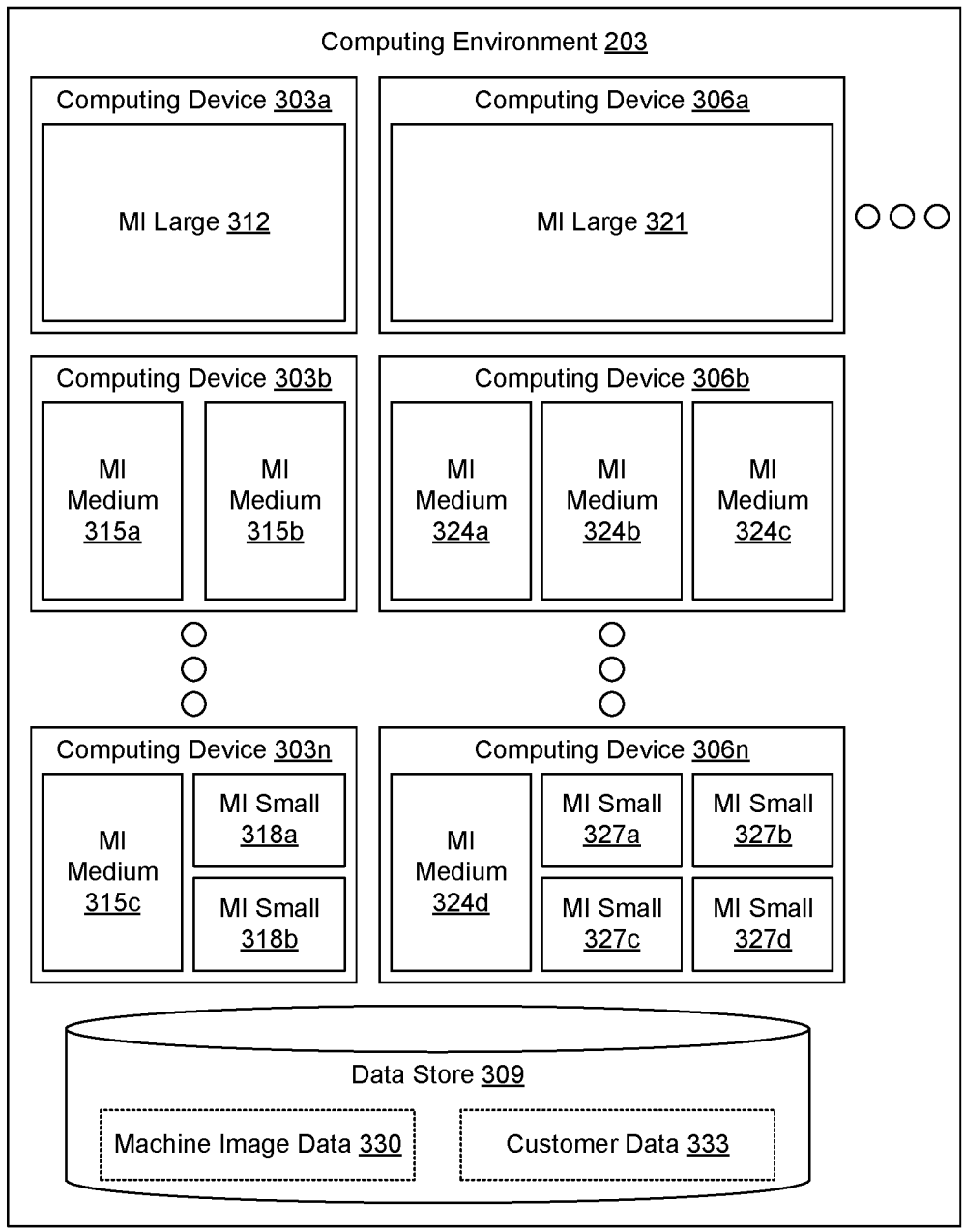
FIG. 3 is a schematic block diagram of a computing environment according to various embodiments of the present disclosure.

Referring now to FIG. 3, shown is another view of the computing environment 203 with examples of the allocated computing resources 215 (FIG. 2) being illustrated. The computing environment 203 includes a plurality of computing devices 303a, 303b . . . 303n, a plurality of computing devices 306a, 306b . . . 306n, and a data store 309. Such components of the computing environment 203 may be in data communication with each other and/or external computing devices by way of a network 209 (FIG. 2). Such computing devices 303 and 306 may be located in a single installation or may be dispersed among many different geographical locations.

The computing devices 303 and 306 may correspond to differing hardware platforms in various embodiments. Accordingly, the computing devices 303 and 306 may have differing hardware configurations of resources, for example, of central processing units (CPUs) that provide general-purpose processing resources, graphics processing units (GPUs) that provide graphics processing resources, system memory, data storage characteristics such as capacity, storage bandwidth, and storage input/output operations per second (IOPS), network bandwidth, and/or other hardware characteristics. In one embodiment, all computing devices 303a, 303b . . . 303n may have a first hardware configuration, while all computing devices 306a, 306b . . . 306n may have a second hardware configuration.

For example, the computing devices 303 may have a certain ratio of a first type of resource to a second type of resource, while the computing devices 306 may have a different ratio of the first type of resource to the second type of resource. In a specific example, the computing devices 303 may have a relatively high amount of memory, while the computing devices 306 may have a relatively high amount of CPU resources. In another specific example, the computing devices 303 may have a relatively high amount of CPU resources, while the computing devices 306 may have a relatively high amount of GPU resources. Although only two sets of computing devices 303 and 306 are shown, it is understood that there may be any number of sets of computing devices 303 and 306 having different hardware configurations.

As a non-limiting example, a customer who is planning to run a data store that will respond to a high volume of queries for small quantities of data may prefer to have a computing device 303, 306 with relatively high storage IOPS capability over storage bandwidth. By contrast, a customer who is planning to run a data backup archive may prefer to have a computing device 303, 306 with relatively high storage bandwidth capability over storage IOPS. The data backup archive may not respond to many requests, but when a request is received, a large quantity of bandwidth may be preferred to transfer data from the data backup archive.

Each computing device 303, 306 may execute one or more machine instances (MI). A machine instance may correspond to an actual machine or to a virtual machine. A virtual machine instance is a virtualized computer system, or a software implementation of a physical computing system. Virtual machines may provide for multiple and/or different operating system environments to run concurrently on a single system having a processor circuit and a memory. As a non-limiting example, multiple instances of a Linux® operating system environment may execute concurrently with multiple instances of a Microsoft® Windows® operating system environment on a single system. Each machine instance may be controlled by different customers, who may have administrative access only to their own instance(s) and no access to the instances of other customers. Multiple machine instances may in fact execute concurrently on a computer system including parallel processors, although multiple instances may appear to execute concurrently on a multithreaded computer system with fewer processors than instances.

Different types of machine instances may be available. In the example of FIG. 2, computing devices 303 may support three types of machine instances: MI large 312, MI medium 315, and MI small 318, each of which may be associated with differing resource configurations. As a non-limiting example, each MI large 312 instance may have four CPU-equivalent units, 15 GB of system memory, and 1,000 GB of data storage. Each MI medium 315 instance may have two CPU-equivalent units, 10 GB of system memory, and 600 GB of data storage. Also, each MI small 318 instance may have one CPU-equivalent unit, 5 GB of system memory, and 250 GB of data storage. In the example of FIG. 2, computing devices 306 may also support three types of machine instances, namely, MI large 321, MI medium 324, and MI small 327. MI large 321, MI medium 324, and MI small 327 may have the same respective configurations as MI large 312, MI medium 315, and MI small 318 or may have different configurations as desired. As a non-limiting example, a MI large 321 instance may have four CPU-equivalent units, 20 GB of system memory, and 1,000 GB of data storage.

The example of three types of machine instances for each type of computing device 303, 306 is not intended to be limiting. In various embodiments, there may be more or fewer types of machine instances for each type of computing device 303, 306. In one embodiment, a machine instance may comprise an allocation of an entire computing device 303, 306 with no virtualization.

In the example of FIG. 3, one MI large 312 instance is executing on computing device 303a; two MI medium 315a, 315b instances are executing on computing device 303b; one MI medium 315c instance and two MI small 318a, 318b instances are executing on computing device is 303n; one MI large 321 instance is executing on computing device 306a; three MI medium 324a, 324b, 324c instances are executing on computing device 306b; and one MI medium 324d instance and four MI small 327a, 327b, 327c, 327d instances are executing on computing device 306n. Each machine instance may be associated with a customer, though any customer may be associated with any number of machine instances.

In various embodiments, a customer may be capable of launching new machine instances and/or terminating machine instances dynamically. Thus, the computing environment 203 may provide elastic computing capability to the customer that can vary over time. As a non-limiting example, a customer hosting an infrequently visited network site on a machine instance may suddenly get an influx of network page hits when the network site is mentioned on television or linked on a popular network site. The increase in network site traffic may overwhelm the computing capability of the machine instance, leading to poor network site performance and availability. To cope with the network site traffic, the customer may launch new machine instances and/or transition to a machine instance with more resources and better performance. The customer may also configure additional or fewer network addresses for the particular machine instances as needed. The operator of the computing environment 203 may need to ensure that spare computing capability is available in the computing environment 203 to accommodate such new machine instances. At the same time, too much spare computing capability may be costly and resource inefficient.

Various applications and/or other functionality may be executed in the machine instances and in the computing devices 303, 306 according to various embodiments. Also, various data is stored in a data store 309 that is accessible to the computing devices 303, 306. The data store 309 may be representative of a plurality of data stores 209 as can be appreciated. The data stored in the data store 309 includes, for example, machine image data 330, customer data 333, and potentially other data.

Machine image data 330 may include data used to launch a machine instance. Machine image data 330 may include one or more disk images of an operating system environment. Some of the disk images may be preconfigured for use by any customer or subset of customers, while others may be customized for a particular customer or subset of customers. In one embodiment, one disk image may be loaded by multiple machine instances.

The customer data 333 may include customer-specific data. In one embodiment, all customer configuration data for a machine instance is stored in customer data 333. In this way, such data may be easily shared among many machine instances. As a non-limiting example, the customer data 333 may include network pages to be served up by one or more network page servers executing on machine instances associated with a customer. However, it is understood that in some embodiments customer-specific data may be stored within local data storage associated with a machine instance.

Referring back to FIG. 2, the resource allocation service 218 is executed to receive resource allocation requests 221 from the client computing device 206 or from within the allocated computing resources 215, where the resource allocation requests 221 request the allocation of a computing resource within the computing environment 203 for an account of an organization. In response to the resource allocation requests 221, the resource allocation service 218 may allocate the requested computing resource to the account. Further, the resource allocation service 218 may enforce resource allocation policies 224 configured for organizations and/or individual accounts of the organizations. Enforcement may include blocking automatic fulfillment of resource allocation requests 221, implementing usage quotas for the allocated computing resources 215, terminating allocating computing resources 215, downgrading machine instance types, or other organization-approved actions aimed at preventing a violation of an organization-approved policy.

The resource allocation service 218 may include a policy recommendation engine 227, an allocation recommendation engine 228, a forecasting engine 230, and/or other components. The policy recommendation engine 227 may be executed to generate recommended resource allocation policies 224 for organizations or individual accounts of the organizations. The resource allocation policies 224 may be recommended based on historical usage, current usage, velocity of allocating resources, resource allocation policies 224 of similarly situated organizations, and/or other factors.

The allocation recommendation engine 228 may be executed to generate recommendations for alternatives to requested computing resources when a resource allocation policy 224 indicates that the requested computing resources should not be allocated. In this regard, the allocation recommendation engine 228 may recommend types of computing resources that are lower cost (e.g., a previous generation machine instance with greater inventory), specific regions for allocating the computing resources, specific time periods for allocating the computing resources, and/or other parameters that would allow a resource allocation request 221 to comply with a configured resource allocation policy 224.

The forecasting engine 230 may be executed to generate cost forecasts associated with resource allocations. In one instance, the forecasting engine 230 may predict what a particular requested allocation will cost over a given time period (e.g., the time remaining in a month). This may simply involve multiplying the number of days remaining by a cost per day, but in other examples, the cost may vary over time. There may be an initial instantiation cost and on-going usage costs. In another instance, the forecasting engine 230 may predict what all of the allocated computing resources 215 for an organization or individual accounts of the organization will cost over the remainder of a time period. If there is a usage component to the cost, the forecasting engine 230 may examine historical usage of the organization or individual accounts in generating this prediction.

The data stored in the data store 212 includes, for example, organization data 233, cost data 236, resource inventory data 239, policy recommendations 242, allocation recommendations 245, and potentially other data. The organization data 233 includes data relating to organizations that have allocated computing resources 215 in the computing environment 203. Such organizations may be entities or individuals. An organization may have a plurality of accounts, which may be used for differing purposes. The organization data 233 may include account data 248 for individual ones of a plurality of accounts of the organization, a resource allocation policy 224, and potentially other data.

The account data 248 includes data relating to an account of the organization. The account may have security credentials such as a username, a password, one or more encryption or decryption keys, information regarding a one-time-password generator, and so on. The account data 248 may include an allocation history 251 for the account and a listing of current allocations 254 for the account. The allocation history 251 may track the computing resources that have been previously allocated for the account and possibly usage metrics relating to the allocations (e.g., processor usage, memory usage, network bandwidth usage, and so on). The current allocations 254 may track the computing resources that are currently allocated to the account under the allocated computing resources 215 potentially along with usage metrics relating to the allocations.

The resource allocation policy 224 may indicate cost limits, allowed or disallowed types of computing resources, allowed or disallowed regions for allocating computing resources, actions to be taken upon policy violations, and/or other parameters. The resource allocation policy 224 may be applied to all or a subset of accounts of an organization. In some cases, individual accounts may have differing corresponding resource allocation policies 224.

The cost data 236 indicates cost information for organizations to allocate computing resources. Different types of computing resources may have differing costs. Also, the costs for computing resources may vary with the time and/or the region/location of allocation. For example, a computing resource may be less costly during periods of low demand than during periods of high demand. A previous generation computing resource may be less desirable and thus less costly than a current generation computing resource. The cost data 236 may indicate costs in terms of initial allocation, processor usage, memory usage, data storage usage, and/or other characteristics of usage. Different organizations may be subject to different cost structures.

The resource inventory data 239 may track the available inventory of computing resources in the computing environment 203 that may available for allocation. The available inventory for a type of computing resource at a location may be a factor in determining the cost for allocating the computing resource.

The policy recommendations 242 correspond to recommendations of resource allocation policies 224 for specific organizations or accounts. The policy recommendations 242 may be generated by the generated by the policy recommendation engine 227. The policy recommendations 242 may be based on various factors, including allocation history 251, current allocations 254, resource allocation policies 224 of organizations or accounts that have similar characteristics, and so forth.

The allocation recommendations 245 correspond to recommendations of alternative allocations in response to resource allocation requests 221 that would violate a resource allocation policy 224. In this regard, the alternative allocations may correspond to allocations of lesser cost in order to fit under a cost limit, allocations in approved regions, allocations of approved types of computing resources, and other types of allocations. The allocation recommendations 245 may be generated by the allocation recommendation engine 228.

The client computing device 206 is representative of a plurality of client devices that may be coupled to the network 209. The client computing device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client computing device 206 may include a display 257. The display 257 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client computing device 206 may be configured to execute various applications such as a client application 260 and/or other applications. The client application 260 may be executed in a client computing device 206, for example, to access network content served up by the computing environment 203 and/or other servers, thereby rendering a user interface 263 on the display 257. To this end, the client application 260 may comprise, for example, a browser, a dedicated application, etc., and the user interface 263 may comprise a network page, an application screen, etc. The client computing device 206 may be configured to execute applications beyond the client application 260 such as, for example, email applications, social networking applications, word processors, spreadsheets, and/or other applications.

Figure 4:
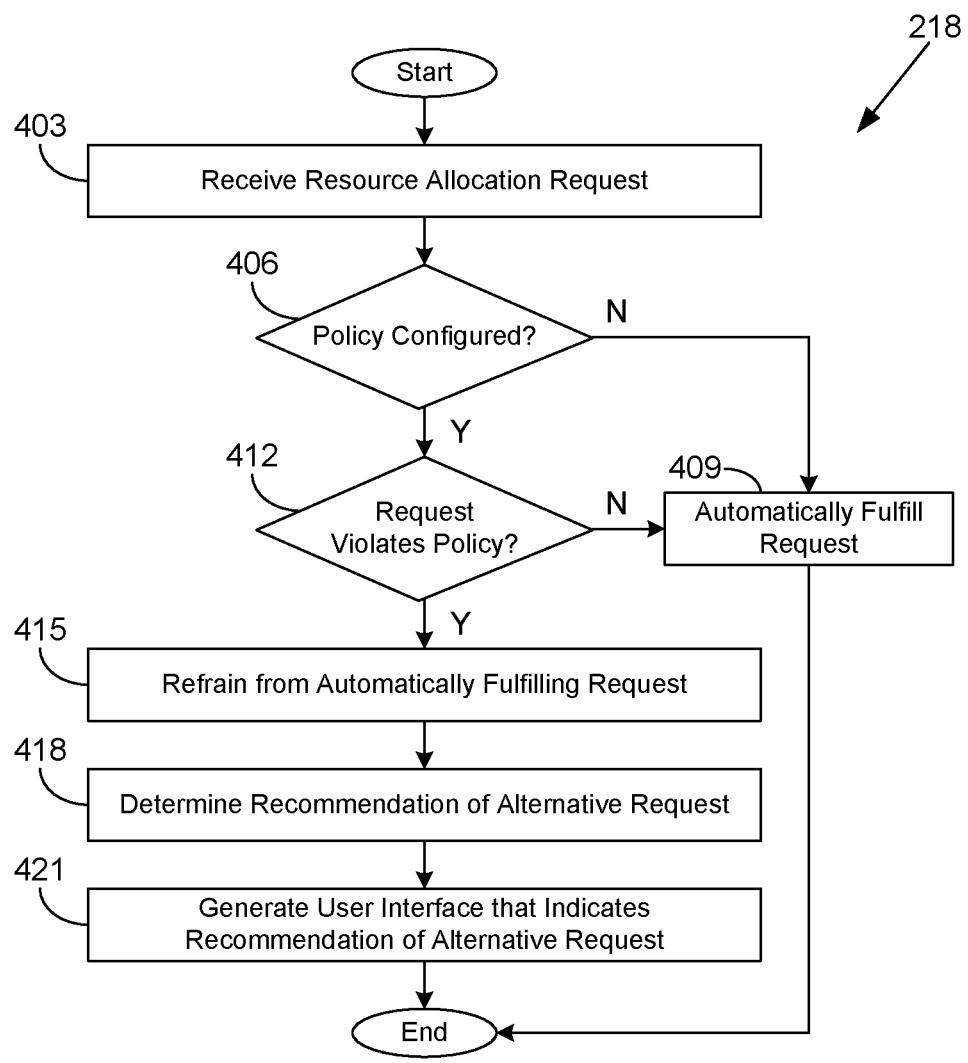
FIG. 4 is a flowchart illustrating one example of functionality implemented as portions of a resource allocation service executed in a computing environment in the networked environment of FIG. 2 according to various embodiments of the present disclosure.

Referring next to FIG. 4, shown is a flowchart that provides one example of the operation of a portion of the resource allocation service 218 according to various embodiments. It is understood that the flowchart of FIG. 4 provides merely an example of the many different types of functional arrangements that may be employed to implement the operation of the portion of the resource allocation service 218 as described herein. As an alternative, the flowchart of FIG. 4 may be viewed as depicting an example of elements of a method implemented in the computing environment 203 (FIG. 2) according to one or more embodiments.

Beginning with box 403, the resource allocation service 218 receives a resource allocation request 221 (FIG. 2) associated with an account of an organization, where the resource allocation request 221 is to allocate a computing resource in a hosted computing environment 203 operated by a third party under a utility computing model. The resource allocation request 221 may be generated programmatically by an auto-scaler or another application and sent via an API to the resource allocation service 218. Alternatively, the resource allocation request 221 may be generated by a user in a manual interaction with a client application 260 (FIG. 2) executed on a client computing device 206. For example, the user may navigate through user interfaces 263 (FIG. 2) in order to make a resource allocation request 221. The resource allocation request 221 may specify various characteristics of the requested computing resource, including, for example, resource type, time of allocation, duration of allocation, location or region, and so on.

In box 406, the resource allocation service 218 determines whether a resource allocation policy 224 (FIG. 2) is configured for this account and organization. This implements a two-tiered approach to enforcing resource allocation policies 224. Since many accounts may not be associated with resource allocation policies 224, it may not be necessary to examine the parameters of the resource allocation request 221 or perform other functions until it is determined via a rapid look-up to the data store 212 (FIG. 2) that such a resource allocation policy 224 is configured. In some cases, an organization may configure a resource allocation policy 224 but exempt one or more particular accounts.

If no resource allocation policy 224 is configured or if the particular account is exempt, the resource allocation service 218 moves from box 406 to box 409 and automatically fulfills the resource allocation request 221 by allocating the requested computing resource. Thereafter, the operation of the portion of the resource allocation service 218 ends.

If, instead, a resource allocation policy 224 is configured, the resource allocation service 218 moves from box 406 to box 412. In box 412, the resource allocation service 218 determines whether a fulfillment of the resource allocation request 221 would violate the resource allocation policy 224. For example, the resource allocation service 218 may ensure that a requested location or region is an allowed location or region and not a disallowed location or region. The resource allocation service 218 may also ensure that a requested type of computing resource is an allowed type of computing resource and not a disallowed type of computing resource.

Where the resource allocation policy 224 specifies a cost limit, the resource allocation service 218 may determine a first projected cost associated with fulfilling the resource allocation request 221 over a time period such as a current time period. For example, the resource allocation service 218 may invoke a forecasting engine 230 (FIG. 2) to operate on the cost data 236 (FIG. 2), the resource inventory data 239 (FIG. 2), and/or other data to generate the first projected cost. The resource allocation service 218 may determine a second projected cost associated with current allocations 254 (FIG. 2) of the organization over a time period such as current time period. For example, the resource allocation service 218 may invoke a forecasting engine 230 to operate on the allocation history 251 (FIG. 2), the cost data 236, the resource inventory data 239 and/or other information to generate the second projected cost. The resource allocation service 218 may then determine a sum the first projected cost and the second projected cost and determine whether the sum exceeds the cost limit. If the sum exceeds the cost limit, the resource allocation policy 224 would be violated.

If the resource allocation service 218 determines that the fulfillment of the resource allocation request 221 would not violate the resource allocation policy 224, the resource allocation service 218 then proceeds to box 409 and automatically fulfills the resource allocation request 221 by allocating the requested computing resource. Thereafter, the operation of the portion of the resource allocation service 218 ends.

In some scenarios, the resource allocation service 218 may send a notification to a user if a proposed allocation is nearing a threshold defined by the resource allocation policy 224, even if the proposed allocation would not or is projected not to violate the resource allocation policy 224. Rather than automatically fulfilling the resource allocation request 221, the resource allocation service 218 may elicit a manual confirmation to approve the allocation in view of the proximity to the threshold. For instance, a user may be notified that, with the proposed allocation, only five percent of the budget for the current month is projected to remain by the end of the month given projected utilization.

Such notifications may be made asynchronously with respect to resource allocation requests 221 when utilization of the allocated computing resources 215 (FIG. 2) differs from that previously projected. That is to say, the resource allocation service 218 may determine that the current allocated computing resources 215 currently exceed or are projected to exceed a threshold within a current time period. In response, the resource allocation service 218 may implement one or more actions to enforce compliance with the resource allocation policy. For example, if the allocated computing resources 215 were previously projected to use 95% of a monthly budget but are now projected to use 115% of a monthly budget, a notification may be sent to a user. Alternatively, or additionally, actions such as terminating allocated computing resources 215, enforcing usage quotas, downgrading machine instance types, and so on, may be performed if configured by the resource allocation policy 224.

If the resource allocation service 218 instead determines that the fulfillment of the resource allocation request 221 would violate the resource allocation policy 224, the resource allocation service 218 instead moves from box 412 to box 415 and refrains from automatically fulfilling the resource allocation request 221. In addition, the resource allocation service 218 may notify a user or an administrative user of the organization that the request cannot be fulfilled without violating the policy. For example, a notification may be sent via a web page, a text message, an email, a telephone call, or other communication approaches.

In box 418, the resource allocation service 218 may use the allocation recommendation engine 228 (FIG. 2) to determine a recommendation of an alternative resource allocation request 221 that would not violate the resource allocation policy 224. For example, the alternative allocation might be time shifted into a lower cost time period or involve computing resource types or regions that are lower cost or permissible under the resource allocation policy 224. In box 421, the resource allocation service 218 may generate a user interface 263 (FIG. 2) that indicates a recommendation of the alternative request. Alternatively, the recommendation may be returned as part of an API response to an API call corresponding to the resource allocation request 221. Thereafter, the operation of the portion of the resource allocation service 218 ends.

In some scenarios, a user may manually intervene to override the policy violation and cause the resource allocation request 221 to be fulfilled. For instance, a user may approve an exception to the cost limit for this particular resource allocation request 221. Alternatively, a user may approve a change to the resource allocation policy 224 via a policy editor.

Figure 5:
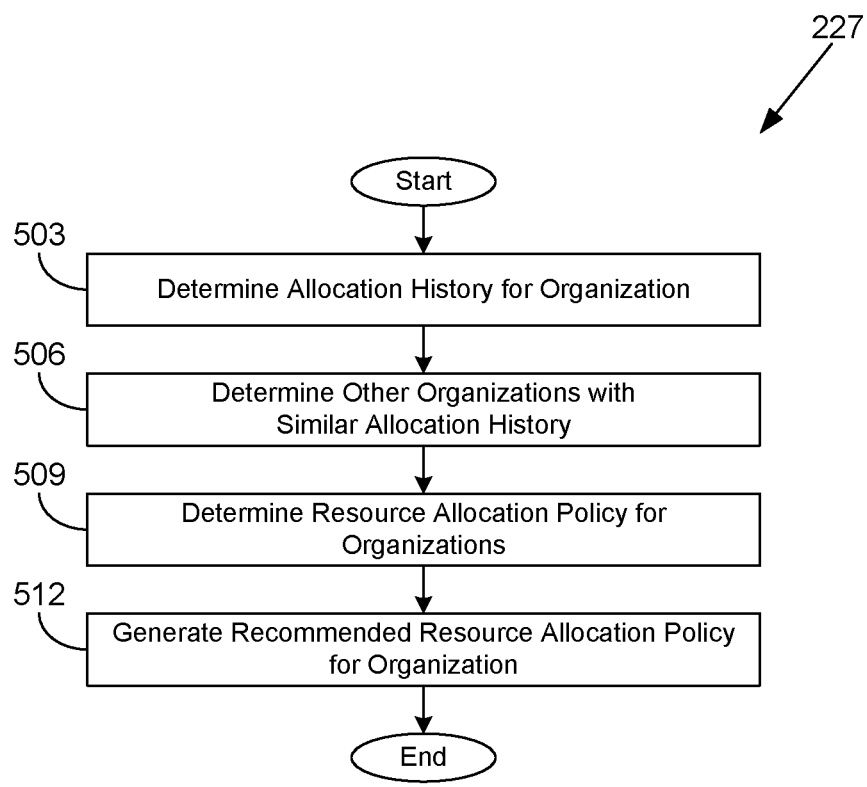
FIG. 5 is a flowchart illustrating one example of functionality implemented as portions of a policy recommendation engine executed in a computing environment in the networked environment of FIG. 2 according to various embodiments of the present disclosure.

Moving on to FIG. 5, shown is a flowchart that provides one example of the operation of a portion of the policy recommendation engine 227 according to various embodiments. It is understood that the flowchart of FIG. 5 provides merely an example of the many different types of functional arrangements that may be employed to implement the operation of the portion of the policy recommendation engine 227 as described herein. As an alternative, the flowchart of FIG. 5 may be viewed as depicting an example of elements of a method implemented in the computing environment 203 (FIG. 2) according to one or more embodiments.

Beginning with box 503, the policy recommendation engine 227 determines the allocation history 251 (FIG. 2) for an organization. This allocation history 251 may describe the types of computing resources allocated, regions/locations where computing resources were allocated, and costs incurred. For example, if the organization only used a particular type of resource and in a particular region exclusively, the organization might not be predicted to use a different type of resource or another region.

In box 506, the policy recommendation engine 227 determines other organizations with similar allocation histories 251. For example, the allocation behavior of other organizations having similar allocation histories 251 in the past may be predictive of future behavior for the organization.

The policy recommendation engine 227 may take into account other characteristics of the organizations that relate to or differ from the organization.

In box 509, the policy recommendation engine 227 determines the resource allocation policies 224 (FIG. 2) set by the organizations that have similar allocation histories 251. In box 512, the policy recommendation engine 227 generates a recommended resource allocation policy 224 for the organization based at least in part on the resource allocation policies 224 of the similar organizations. Thereafter, the operation of the portion of the policy recommendation engine 227 ends. In response to receiving an approval from the organization, the recommended resource allocation policy 224 may be configured for the organization.

Figure 6:
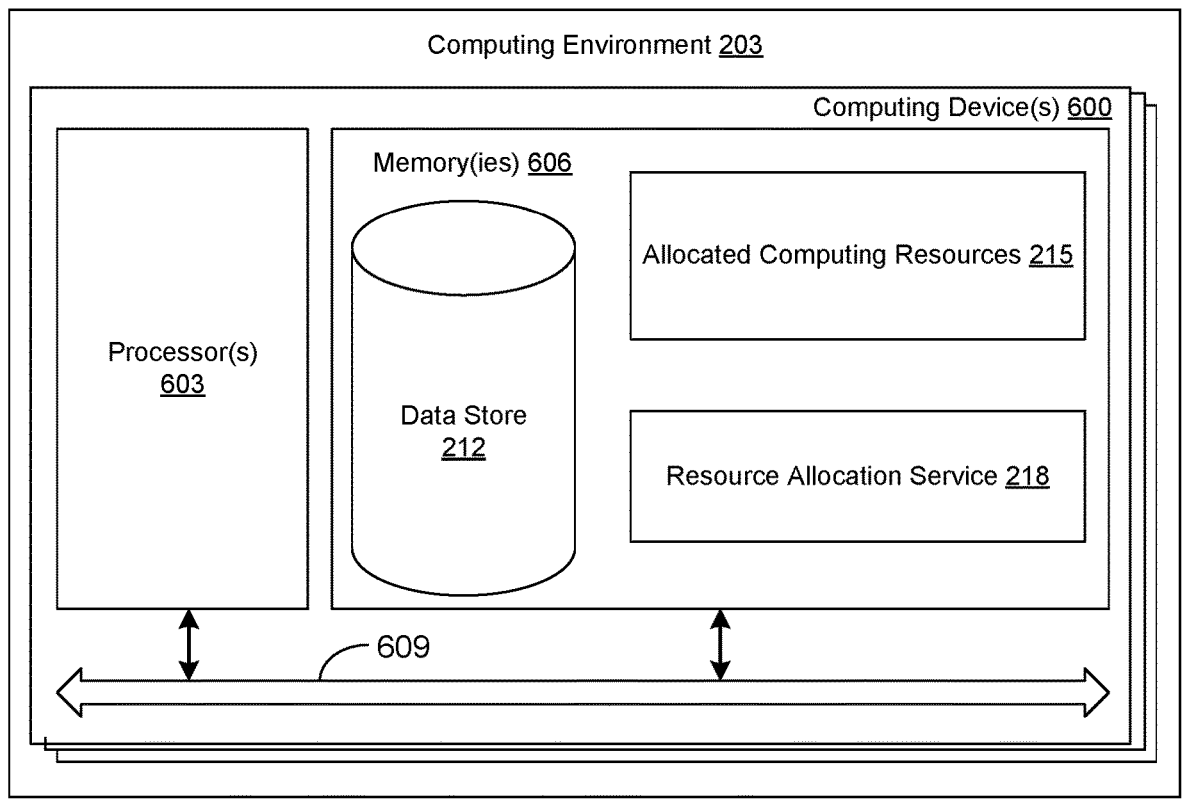
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the allocated computing resources 215, the resource allocation service 218, and potentially other applications. Also stored in the memory 606 may be a data store 212 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the allocated computing resources 215, the resource allocation service 218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4 and 5 show the functionality and operation of an implementation of portions of the resource allocation service 218 and the policy recommendation engine 227. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the allocated computing resources 215 and the resource allocation service 218, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the allocated computing resources 215 and the resource allocation service 218, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices 600 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:

automatically generating, by at least one computing device, a recommendation of an organization resource allocation policy for an organization in a hosted computing environment operated by a third party under an elastic computing model in which resources allocated to the organization in the hosted computing environment vary over time, the hosted computing environment being used by a plurality of organizations, the organization resource allocation policy being generated based at least in part on an allocation history of resources allocated to the organization in the hosted computing environment across a plurality of accounts of the organization;

configuring, by the at least one computing device, the organization resource allocation policy for the organization in response to receiving an approval from the organization, wherein the organization resource allocation policy prohibits fulfillment of resource allocation requests by the hosted computing environment operated by the third party that does not comply with one or more allocation conditions specified in the organization resource allocation policy for the organization;

receiving, by the at least one computing device, a resource allocation request to allocate a computing resource the hosted computing environment from one of the plurality of accounts;

determining, by the at least one computing device, that a provider resource allocation policy of the hosted computing environment applies to the resource allocation request;

determining, by the at least one computing device, that a fulfillment of the resource allocation request would not violate the provider resource allocation policy;

determining, by the at least one computing device, that the organization has configured the organization resource allocation policy;

after determining that the organization has configured the organization resource allocation policy, determining, by the at least one computing device, that the fulfillment of the resource allocation request would violate the organization resource allocation policy;

refraining from automatically fulfilling, by the at least one computing device, the resource allocation request in response to determining that the fulfillment of the resource allocation request would violate the organization resource allocation policy; and generating, by the at least one computing device, a user interface that indicates a recommendation of an alternative resource allocation request that would not violate the organization resource allocation policy.

2. The method of claim 1, wherein the organization resource allocation policy specifies a cost limit for the organization over a time period, and determining that the fulfillment of the resource allocation request would violate the organization resource allocation policy further comprises:

determining a first projected cost associated with the fulfillment of the resource allocation request over the time period;

determining a second projected cost associated with computing resource allocations of the organization in the hosted computing environment over the time period; and determining that a sum of the first projected cost and the second projected cost would exceed the cost limit over the time period.

3. The method of claim 1, wherein at least one of the plurality of organizations has not configured any organization resource allocation policy in the hosted computing environment such that only the provider resource allocation policy applies by default to resource allocation requests from the at least one of the plurality of organizations.

4. A method, comprising:

configuring, by at least one computing device, an organization resource allocation policy for an organization in response to receiving an approval from the organization, wherein the organization resource allocation policy prohibits fulfillment of resource allocation requests by a hosted computing environment operated by a third party that does not comply with one or more allocation conditions specified in the organization resource allocation policy for the organization;

receiving, by the at least one computing device, a resource allocation request to allocate a computing resource within the hosted computing environment, the resource allocation request associated with an account of an organization;

determining, by the at least one computing device, that a provider resource allocation policy of the hosted computing environment applies to the resource allocation request;

determining, by the at least one computing device, that a fulfillment of the resource allocation request would not violate the provider resource allocation policy;

determining, by the at least one computing device, that the fulfillment of the resource allocation request would violate the organization resource allocation policy configured by the organization within the hosted computing environment, wherein the organization resource allocation policy prohibits fulfillment of resource allocation requests by the hosted computing environment that does not comply with one or more allocation conditions specified in the organization resource allocation policy for the organization;

refraining from automatically fulfilling, by the at least one computing device, the resource allocation request in response to determining that the fulfillment of the resource allocation request would violate the organization resource allocation policy; and sending, by the computing device, a notification to a user associated with the resource allocation request, wherein the notification recommends a modification to the resource allocation request that would bring the resource allocation request in compliance with the organization resource allocation policy.

5. The method of claim 4, wherein the modification comprises an alternative type of machine instance that differs from that requested by the resource allocation request.

6. The method of claim 4, wherein the modification comprises an alternative time period for execution that differs from that requested by the resource allocation request.

7. The method of claim 4, wherein determining that the fulfillment of the resource allocation request would violate the organization resource allocation policy further comprises determining, by the at least one computing device, that a cost associated with the fulfillment of the resource allocation request would exceed a cost limit over a current time period in view of a projected rate of cost consumption by the organization in the hosted computing environment.

8. The method of claim 4, wherein determining that the fulfillment of the resource allocation request would violate the organization resource allocation policy further comprises determining that a particular type of computing resource specified in the resource allocation request is not permitted under the organization resource allocation policy.

9. The method of claim 4, wherein determining that the fulfillment of the resource allocation request would violate the organization resource allocation policy further comprises determining that a particular location for the computing resource specified in the resource allocation request is not permitted under the organization resource allocation policy.

10. The method of claim 4, further comprising determining, by the at least one computing device, that the organization resource allocation policy is configured by the organization before beginning determining that the fulfillment of the resource allocation request would violate the organization resource allocation policy.

11. The method of claim 4, wherein the organization resource allocation policy applies to a plurality of accounts of the organization, and the organization resource allocation policy exempts another account of the organization from a cost limit.

12. The method of claim 4, further comprising:

determining, by the at least one computing device, that that current computing resource allocations by the organization within the hosted computing environment currently exceed a threshold of the organization resource allocation policy or are projected to exceed the threshold within a current time period; and implementing, by the at least one computing device, that at least one action to enforce compliance with the organization resource allocation policy.

13. The method of claim 4, wherein the hosted computing environment is operated by a third party under an elastic computing model in which resources allocated to the account vary over time.

14. The method of claim 4, further comprising:

automatically generating, by the at least one computing device, a recommendation of the organization resource allocation policy for the organization in the hosted computing environment operated by the third party under an elastic computing model in which resources allocated to the organization in the hosted computing environment vary over time, the hosted computing environment being used by a plurality of organizations, the organization resource allocation policy being generated based at least in part on an allocation history of resources allocated to the organization in the hosted computing environment across a plurality of accounts of the organization.

15. A non-transitory, computer-readable medium comprising machine-readable instructions that, when executed by a processor of a computing device, cause the computing device to:

configure an organization resource allocation policy for an organization in response to receiving an approval from the organization, wherein the organization resource allocation policy prohibits fulfillment of resource allocation requests by a hosted computing environment operated by a third party that does not comply with one or more allocation conditions specified in the organization resource allocation policy for the organization;

receive a resource allocation request to allocate a computing resource within the hosted computing environment, the resource allocation request associated with an account of an organization;

determine that a provider resource allocation policy of the hosted computing environment applies to the resource allocation request;

determine that a fulfillment of the resource allocation request would not violate the provider resource allocation policy;

determine that the fulfillment of the resource allocation request would violate the organization resource allocation policy configured by the organization within the hosted computing environment, wherein the organization resource allocation policy prohibits fulfillment of resource allocation requests by the hosted computing environment that does not comply with one or more allocation conditions specified in the organization resource allocation policy for the organization;

refrain from automatically fulfilling the resource allocation request in response to determining that the fulfillment of the resource allocation request would violate the organization resource allocation policy; and send a notification to a user associated with the resource allocation request, wherein the notification recommends a modification to the resource allocation request that would bring the resource allocation request in compliance with the organization resource allocation policy.

16. The non-transitory, computer-readable medium of claim 15, wherein the modification comprises an alternative type of machine instance that differs from that requested by the resource allocation request.

17. The non-transitory, computer-readable medium of claim 15, wherein the modification comprises an alternative time period for execution that differs from that requested by the resource allocation request.

18. The non-transitory, computer-readable medium of claim 15, wherein the organization resource allocation policy applies to a plurality of accounts of the organization, and the organization resource allocation policy exempts another account of the organization from a cost limit.

19. The non-transitory, computer-readable medium of claim 15, wherein the machine-readable instructions that, when executed by the processor of the computing device, further cause the computing device to:

determine that that current computing resource allocations by the organization within the hosted computing environment currently exceed a threshold of the organization resource allocation policy or are projected to exceed the threshold within a current time period; and implement at least one action to enforce compliance with the organization resource allocation policy.

20. The non-transitory, computer-readable medium of claim 15, wherein determining that the fulfillment of the resource allocation request would violate the organization resource allocation policy further comprises determining that a particular type of computing resource specified in the resource allocation request is not permitted under the organization resource allocation policy.

* * * * *